Oct. 4, 1932. J. F. LIVINGOOD 1,881,202
FRONT WHEEL DRIVE MECHANISM FOR MOTOR VEHICLES
Filed Feb. 17, 1930
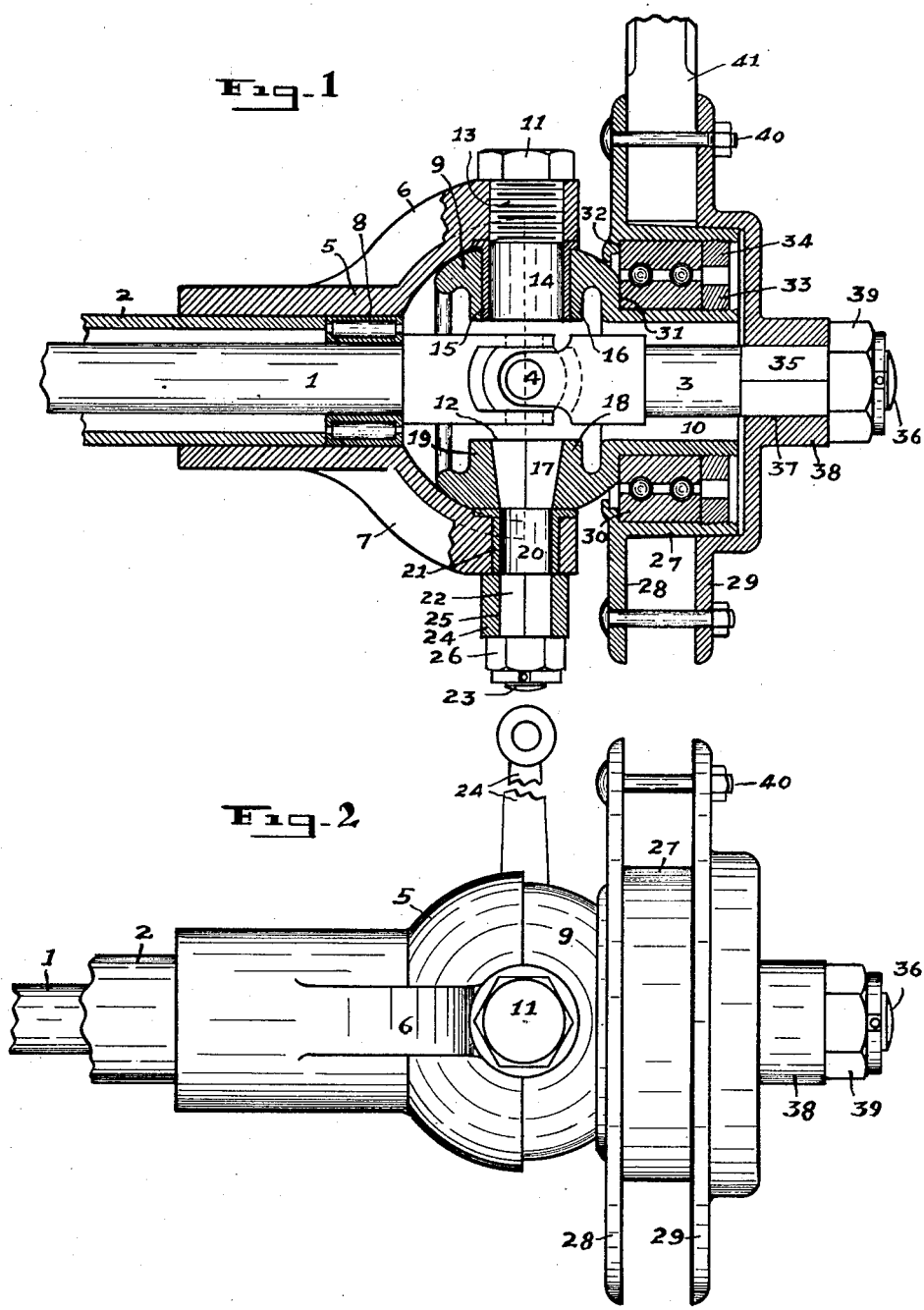

Patented Oct. 4, 1932

1,881,202

UNITED STATES PATENT OFFICE

JESSE F. LIVINGOOD, OF WEST FINLEY, PENNSYLVANIA

FRONT WHEEL DRIVE MECHANISM FOR MOTOR VEHICLES

Application filed February 17, 1930. Serial No. 428,920.

My invention relates broadly to a front wheel drive mechanism for motor vehicles, but more particularly to the attachments for the front wheels of the motor vehicle.

Important objects of the invention are to provide a substantial front wheel attachment of the character described which will permit the driving and steering of the front wheels at the same time, which is simple in its construction and arrangement, strong, durable and efficient in its use, compact and comparatively inexpensive to manufacture.

To the accomplishment of these and such other objects as may hereinafter appear the invention consists of the novel construction, combination and arrangement of parts herein specifically described, and illustrated in the accompanying drawing wherein is shown an embodiment of the invention, but it is to be understood that changes in the form, proportions and details of construction may be resorted to that come within the scope of the claim hereunto appended.

In the drawing wherein like numerals of reference designate corresponding parts throughout the several views:—

Figure 1 is a longitudinal cross sectional view of a front wheel attachment, constructed in accordance with the invention.

Figure 2 is a top plan view thereof.

Referring in detail to the drawing 1 denotes an axle, the inner end of which is operatively connected to a differential driving mechanism of the usual costruction and in the usual manner. The axle 1 is suitably enclosed in an axle tube 2, and has its outer end connected to an axle extension 3 by means of a uiversal joint 4, of the usual construction.

The outer end of the axle tube 2 carries an enlarged semi-spherical socket member 5, which is provided with a pair of integrally formed bearing ribs, indicated at 6 and 7. The bearing ribs 6 and 7 are respectively disposed at the top and bottom of the socket member 5 at the outer side of the latter.

The socket member 5 is rigidly fixed in position, in any suitable manner, to the outer end of the axle tube 2, and carries a roller bearing 8 for journaling the outer end of the axle 1 directly inwardly of the universal joint 4.

A ball member 9 is pivotally mounted in the socket member 5, and is provided with an integrally formed tubular extension 10, which extends outwardly therefrom.

The ball member 9 is pivotally connected in the socket member 5 by a pair of connecting bolts, indicated at 11 and 12. The top connecting bolt 11 is threadedly fixed, as at 13, in the outer end of the upper bearing rib 6, and has its inner end portion 14 journaled for rotation in a bushing 15, which is fixed in a boss 16 disposed within the ball member 9.

The bottom connecting bolt 12 has a square tapered head 17, which extends through a corresponding shaped aperture 18 formed in a boss 19. The latter is disposed within the ball member 9. The engagement of the bolt head 17 in the aperture 18 of the ball member 9 secures the former to the latter to shift therewith.

The bearing portion 20, of the bottom connecting bolt 12, is journaled for rotation in a bushing 21, which is fixed in the outer end of the lower bearing rib 7.

The bottom connecting bolt 12 is further formed to provide a squared connecting shank 22 and a threaded end 23, which project below the lower bearing rib 7. A steering arm 24, formed with a corresponding opening 25 connects with the squared shank 22, and is fixedly secured to the latter by a nut 26 mounted on the threaded bolt end 23. The steering arm 24 extends rearwardly approximity at right angles relatively to the longitudinal disposition of the axle 1, and is adapted for connection with the steering apparatus of the motor vehicle in the usual manner well known in the art.

The bottom connecting bolt 12 is placed in position by passing the same through the threaded bolt opening in the upper bearing rib 6 and through the bushing 15 in the associated boss 16 during the assembly of the device, and said bolt opening and bushing are of sufficient size to permit of the free passage of the bottom connecting bolt 12 therethrough.

It will here be noted that the top bolt 11 is detachably fixed in socket member 5 and is pivotally connected with the ball member 9, while the bottom bolt 12 is removably secured against rotation in the ball member 9 and is pivotally connected in the socket member 5. The connecting bolts 11 and 12 and the universal joint 4, are all arranged in concentric vertical alignment, and in consequence when the steering arm 24 is shifted, corresponding movement will be imparted to the ball member 9 in the socket member 5 to effect the steering operation.

The hub 27, of the motor vehicle wheel 41 is revolubly connected to the ball member 9 and fixedly connected to the axle extension 3, and comprises an inner flanged member 28 and an associated outer flanged member 29.

A ball bearing 30 connects the inner hub 28 with the tubular extension 10, of the ball member 9. The ball bearing 30 engages the outer periphery of the tubular extension 10 and the inner periphery of the inner hub member 28. The inner end of the ball bearing abuts against the shoulders 31 and 32, which are respectively formed at the inner end of the tubular extension 10 and of the inner hub member 28.

The ball bearing 30 is secured in position on the tubular extension 10 by an internally threaded collar 33, which is mounted on the externally threaded outer end of the tubular extension 10 and engages the fixed portion of the ball bearing 30. The inner hub member 28 is secured in position on the ball bearing 30 by an externally threaded collar 34, which is mounted in the internally threaded outer end of the inner hub member 28, and engages the revolving portion of the ball bearing 30.

The axle extension 3 extends through the tubular extension 10 and projects from the latter. Such projecting portion is formed to provide a squared connecting portion 35 and a threaded end portion 36. The squared connecting portion 35 extends through a corresponding aperture 37, which is provided therefor in an outwardly projecting neck 38 formed integral with the outer hub member 29. The latter is secured to the axle portion 35, to rotate therewith, by a nut 39 threadedly engaged on the threaded portion 36.

The flanged outer hub member 29 overlaps the inner hub member 28, and is securely clamped to the latter, by a plurality of bolts 40. The clamping action of the bolts 40 further serve to secure the vehicle wheel 41, to the hub 27, in the usual manner.

The rotation of the axle 1 and axle extension 3 will drive the vehicle wheel 41, as the hub 27 is fixed to the outer end of said axle extension 3, and is permitted to revolve freely on the ball bearing 30.

It will be noted that the entire vehicle wheel 41 is carried by the ball member 9, and as the latter is shiftable on its connection in the socket member 5, as hereinbefore stated, the vehicle wheel 41 will shift with the latter during the steering operation.

It will be obvious that the bolt head 17, shank 22 and axle extension 35, may be keyed or otherwise fixed in associated parts instead of being square as herein set forth. Further the device is suitably lubricated to assure its efficient operation, and the construction of the socket and ball members 5 and 9, are particularly adapted for lubrication purposes.

The present invention provides a simple and substantial front drive connection for motor vehicle wheels, which may be cheaply manufactured and maintained at minimum expense and which allows an easy, free steering movement.

What I claim is:

In a front wheel drive mechanism for motor vehicles, the combination of an axle tube, a driving axle extending through said tube and journaled for rotation in the latter, a socket member including an upper and a lower bearing rib and being fixed to the outer end of said tube, a ball member provided with a pair of vertically aligned apertures, a connecting bolt being fixed in the upper of said bearing ribs and pivotally engaging in the upper of said pair of apertures, a connecting bolt being fixed in the lower of said pair of apertures and pivotally engaging the lower of said bearing ribs, a squared shank formed integral with said last mentioned connecting bolt and projecting below said lower rib for fixedly connecting the steering arm of the motor vehicle therewith, a tubular extension formed integral with said ball member and projecting outwardly from the latter, an axle extension connecting for universal movement with the outer end of said driving axle and extending through said tubular extension, means connecting the front wheel to said axle extension, a ball bearing element for the front wheel being mounted in the hub of the latter and on the periphery of said tubular extension, an internally threaded collar threadedly engaging on said tubular extension for securing said ball bearing element on the latter, and an exteriorly threaded collar threadedly engaging the hub of the front wheel for securing said ball bearing element in said hub.

In testimony whereof I affix my signature.

JESSE F. LIVINGOOD.